Aug. 30, 1966  K. B. NIELSEN  3,269,299
APPARATUS FOR GRILLING OF CHICKENS
Filed Aug. 24, 1965  3 Sheets-Sheet 1
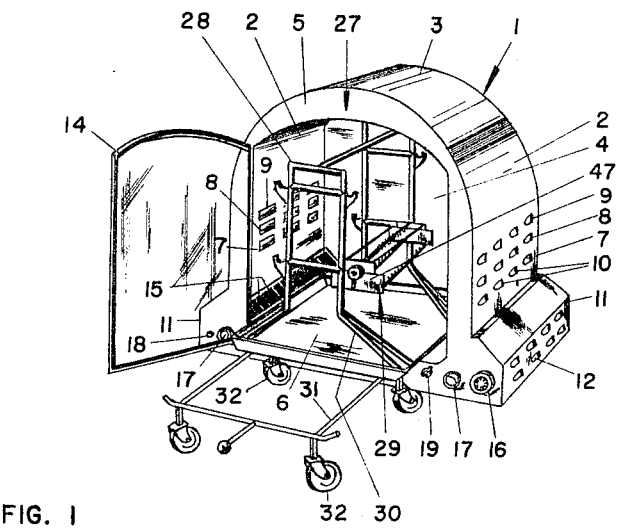
FIG. 1
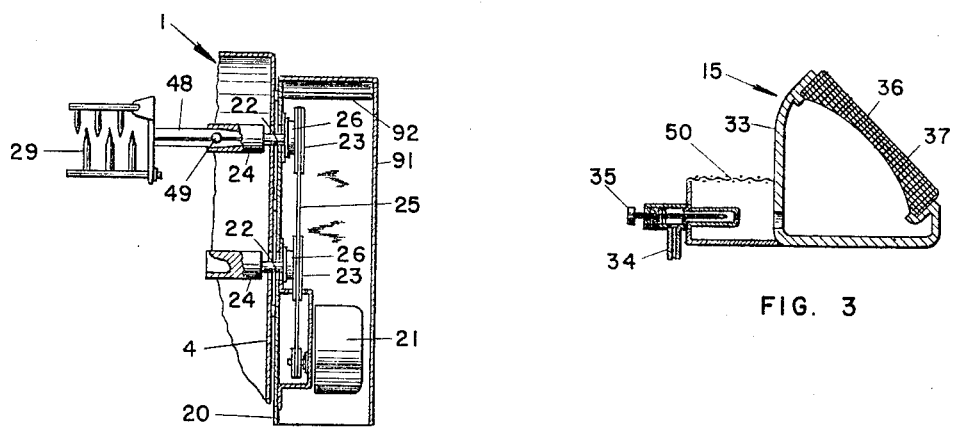
FIG. 2
FIG. 3
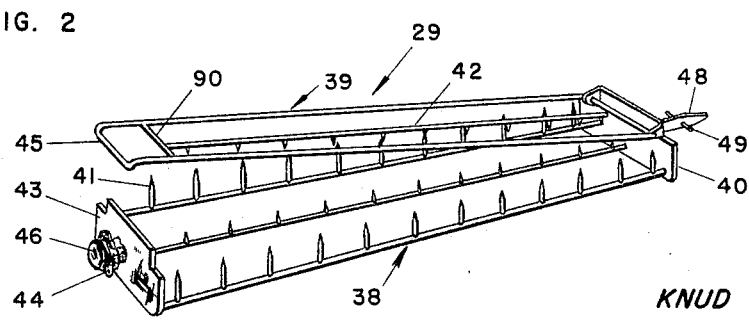
FIG. 4
INVENTOR
KNUD B. NIELSEN
BY Cavanagh & Norman
ATTORNEY Aug. 30, 1966  K. B. NIELSEN  3,269,299
APPARATUS FOR GRILLING OF CHICKENS
Filed Aug. 24, 1965  3 Sheets-Sheet 2

INVENTOR
KNUD B. NIELSEN

BY
Cavanagh & Norman
ATTORNEY

Aug. 30, 1966  K. B. NIELSEN  3,269,299
APPARATUS FOR GRILLING OF CHICKENS
Filed Aug. 24, 1965  3 Sheets-Sheet 3

INVENTOR
KNUD B. NIELSEN

BY
ATTORNEY

United States Patent Office 3,269,299
Patented August 30, 1966

3,269,299
APPARATUS FOR GRILLING OF CHICKENS
Knud Bjarne Nielsen, Bute St., Box 62, Ayr,
Ontario, Canada
Filed Aug. 24, 1965, Ser. No. 482,111
6 Claims. (Cl. 99—421)

This invention relates to apparatus for the grilling or broiling of chicken and other foodstuffs and the like, and is a continuation-in-part of my co-pending United States patent application Serial No. 305,135 filed August 28, 1963, and now abandoned, for Method and Apparatus for Grilling of Chickens.

A number of well known methods of grilling chickens and meat have heretofore been proposed, such methods generally employing means of rotatably supporting a chicken adjacent to a source of heat such as electric heaters, charcoal fires and the like.

A number of disadvantages are associated with these prior methods, the most common of which is too low an oven temperature, this resulting in a relatively long roasting time. These are the main causes of loss of flavour occurring when fat and the natural juices within the chicken or meat are allowed to escape. Furthermore these prior methods would also be disadvantageous in a cooking and selling operation such as that contemplated using my invention which is where a very rapid turnover is essential, where pieces of chicken or other similar pieces of meat or fish being grilled to order while the customer waits.

Furthermore grilling devices of the prior art have usually incorporated a flue or vent at or near the top of the chamber giving rise to a continuous draft or air flow past the food during cooking which resulted in rapid drying out and loss of flavour.

The present invention seeks to overcome these difficulties by the provision of high capacity, infra-red panels suitably placed within an enclosure and directed to radiate on suitable parts of chickens or other similar parts of meat or fish prepared as to fit within the limits of the spits utilized as a part of this present invention.

Another feature of this invention is the provision of an enclosure provided with low level vents whereby the temperature about the food being roasted at the same time is kept comparatively high, and constant at approximately 650° F., and the enclosure relatively free of products of combustion. The temperature mentioned relates to the actual heat developed in the interior of the enclosure and it is measured by a thermometer shielded against the direct infra-red radiation from the heating panels after the grill has been operating at full capacity for 15 minutes.

A still further feature of this invention is the provision of a completely removable support for parts of chickens or similar suitable prepared meat or fish, said support having rotating means thereon to ensure complete coverage of the meat being roasted with heat radiated from the aforementioned infra-red panels, said rotating means being singly removable from the enclosure.

Still another feature of this invention is that it is provided with a universal gas heating system, easily adjustable both to propane, natural and coal gas, and a motor which may be either a battery power supplied type or a hydro electrical power supplied type.

The invention further seeks to provide a grilling apparatus having improved heat distribution and air flow to maintain a high temperature and to minimize drying out.

Therefore, using my invention with the combination of propane gas supply and a battery driven motor renders it fully mobile and easily installable in a vehicle.

Using my invention as a stationary unit it might be more convenient to connect with existing pipe and/or power lines where only the motor has to be adapted to the type of power concerned.

These and other features of the invention will become apparent from the following detailed description and accompanying drawings, in which:

FIGURE 1 is a perspective view of a grilling enclosure showing the removable support racks partially removed therefrom;

FIGURE 2 is a section through the engagement and drive means for the rotatable spit assemblies;

FIGURE 3 is a section through one of the infra-red burners illustrating the operation thereof;

FIGURE 4 is a perspective view of a spit assembly forming part of the invention;

Figure 6:
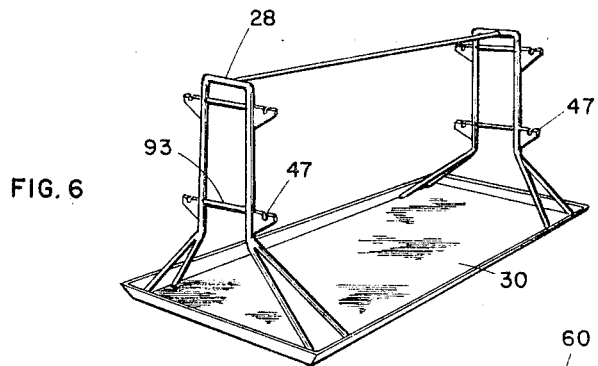
FIGURE 6 is a perspective view of the support stand for the spit assemblies.

Referring to FIGURE 1 the grilling or broiling apparatus according to the present invention comprises a casing 1 having opposed parallel vertical side walls 2, an arcuate roof portion 3 extending between side walls 2 and a vertical end wall 4. A vertical end panel 5 is provided with a door-opening for access to the interior of casing 1. A flat horizontal floor 6 completes casing 1.

According to the invention heat is supplied from the lowest point in the casing 1 adjacent the level of floor 6 and will cause the air and gases to rise upwardly therein towards roof 3, heating food therein, and then, being at a somewhat lower temperature, will be displaced downwardly by hotter air rising from below. This continuous circulation would take place relatively slowly causing substantial temperature gradients resulting in uneven cooking and accordingly, the natural air circulation by convection is augmented by agitation by means to be described below. During cooking excess air and gases are permitted to vent from casing 1 as soon as a pressure in excess of atmospheric pressure is built up, from a point in casing 1 located low down on side walls 2.

In order to achieve this operation, casing 1 is provided with parallel rows of air vents 7, 8 and 9 formed in opposite sides of casing 1 in side walls 2 thereof and having downwardly directed baffles 10 defining a downwardly directed air flow path therefrom inhibiting flow of heated air and gases therefrom.

Attached to the exterior of side walls 2 along their length are burner housings 11 provided with air inlet ports 12 therein for admitting air for combustion. Door 14, preferably made from hardened glass or other suitable transparent material is hingedly fastened to end panel 5 in order that the contents of casing 1 may be inspected from time to time and to protect the operator from the intensive radiation.

Located subjacent to casing 1 along two sides thereof are a plurality of infra-red burner radiant units 15 contained within housings 11, said burners being directed upwardly and inwardly to radiate into the interior of casing 1.

Burners 15 are preferably of the gas burning radiant type, which type provide a large amount of intense infra-red radiation. The particular construction of burners 15 will be described subsequently in FIGURE 3.

The front mounted controls for casing 1 comprise a timer 16, two burner controls 17, a motor control switch 18, and a door catch 19 of steel or the like.

Figure 5:
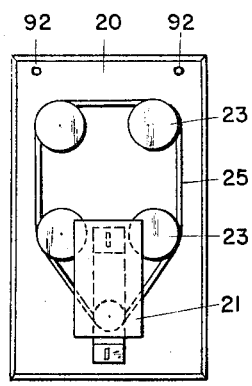
FIGURE 5 is a diagrammatic sketch of the rear of the invention showing the drive motor and pulley wheel layout.
Figure 11:
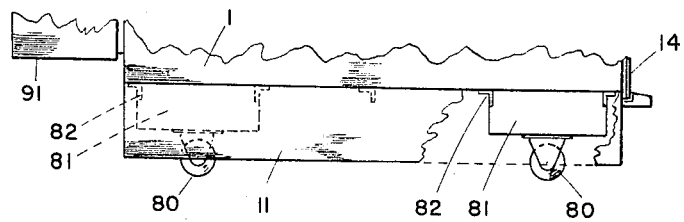
FIGURE 11 is a fractional side elevation of the enclosure showing the cross bracing members and the wheels.

With reference to FIGURES 2 and 5 a heat protection plate 20 is mounted parallel with and spaced apart from the rear end wall 4 of casing 1 and is adapted to support a drive motor 21.

A plurality of shafts 22 extend to rear wall 4 of casing 1 and through plate 20. The rear end of each shaft 22 is supported in a conventional sealed bearing 26 mounted on the plate 20 and in turn supports a drive sprocket or pulley 23 while the forward end of each shaft 22 within casing 1 supports a spring loaded slotted socket 24. An endless chain or belt 25 transmits drive from motor 21 to sprockets 23, thereby causing shafts 22 to rotate. It should be noted that each socket 24 is driven by spline means or the like permitting it to be moved actually upon its shaft 22 while still being driven by shaft 22. The spring loading biases each socket 24 towards the front of casing 1 and at the same time permits each socket 24 to be pushed far enough back when engaged to provide a seal between it and rear wall 4 through which its shaft 22 passes.

With further reference to FIGURE 1, an inner spit assembly indicated generally as 27 is removably placed within casing 1 and in FIGURE 1 is indicated as being half removed.

Assembly 27 comprises a frame 28 which supports a number of individual, rotatable spits indicated generally as 29. The spits 29 will be further described in FIGURE 4. Frame 28 is placed upon and attached to drip tray 30. During removal of assembly 27 a support frame 31 mounted on casters 32 is provided whereby assembly 27 may be slid over frame 31 and the assembly 27 may be removed remote from casing 1 for adding or removing pieces of chicken or similar prepared meat or fish to fit within the limit of the spits.

Referring to FIGURE 3 one type of infra-red burner units 15 which may be used advantageously in this device is illustrated and comprises a chamber 33 provided with a gas inlet pipe 34 and control valve 35. One side of chamber 33 is left open to receive a porous ceramic plate 36 which allows a gas and air mixture to seep therethrough, this mixture then being ignited from the exterior surface 37 of porous ceramic plate 36, thereby causing said plate to become red hot without any flames being evident. This method of surface combustion produces an intense high capacity infra-red radiation which is then directed within the interior of casing 1 as aforesaid. It should be noted that the gas inlet side of chamber 33 is open to the atmosphere through inlet ports 12 to ensure an adequate air supply to support the combustion of the gas, a gauze covering 50 being adequate protection against the ingress of foreign objects and the like.

With reference to FIGURE 4 a preferred type of spit 29 is illustrated and comprises a lower jaw indicated as 38 and an upper jaw indicated as 39 being hingeably supported on a back plate 40 which is secured to the rear end of lower jaw 38. Both jaws 38 and 39 are provided with a plurality of spikes 41 and 42 respectively, these spikes intermeshing to securely grip a portion of a chicken or similar prepared meat or fish placed on the spit assembly. A front plate 43 is secured along the forward edge of lower jaw 38 and has a locking mechanism 44 thereon which is adapted to secure front lip 45 on upper jaw 39 upon said upper jaw 39 being swung down into position adjacent to lower jaw 38. A stud end 46 projects beyond lock 44 and is adapted to engage within bearing 47 shown in FIGURES 1 and 6 and is more adequately described under FIGURE 13.

Rear plate 40 supports a projecting rod 48 thereon which is rotatably supported by rear bearing 47 of frame 28 and which is fitted with a cross pin 49, pin 49 engaging with socket 24 as shown in FIGURE 2 upon spit assembly 27 being fully placed within casing 1. It will be appreciated that the apparatus as disclosed utilizes a number of spits 29 as shown in FIGURE 4 and that each spit 29 is driven by a shaft 22 in the manner as aforesaid.

Being spring loaded each socket 24 is able to rotate sufficiently to ensure full engagement with its respective cross pin 49 and, furthermore, upon spit assembly 27 being fully entered in casing 1 all the sockets 24 are caused to move to locations adjacent to the rear wall 4 and thereby substantially protect the externally located bearings 26 by preventing the escaping of hot gases. Furthermore, being spring loaded the sockets 24 secure trouble free rotation of the spits 29 above said spits 29 and frame 28 expanding under the intense heat in the casing during the grilling operation.

Figure 7:
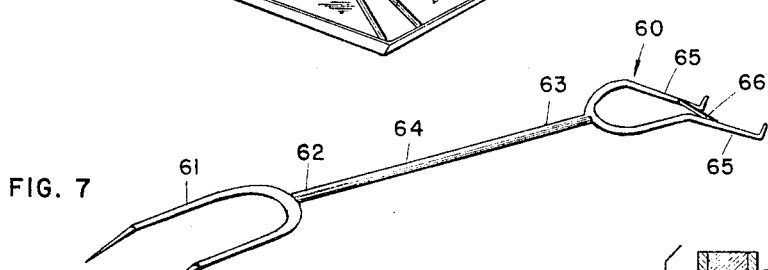
FIGURE 7 is a perspective view of the combination fork and lifter utilized with the invention.
Figure 8:
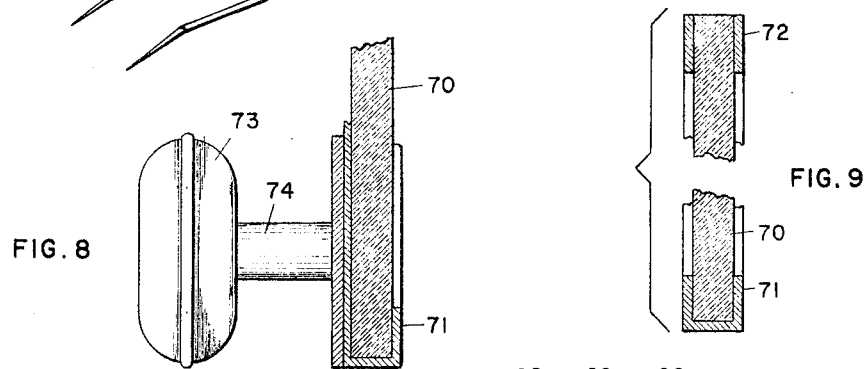
FIGURE 8 is an enlarged, part sectional, side elevation of the front door of the enclosure and handle assembly.
Figure 9:
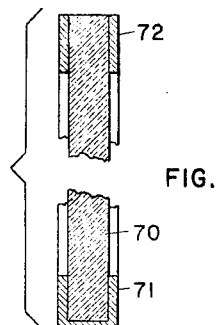
FIGURE 9 is an enlarged sectional side elevation of the front door of the enclosure.
Figure 10:
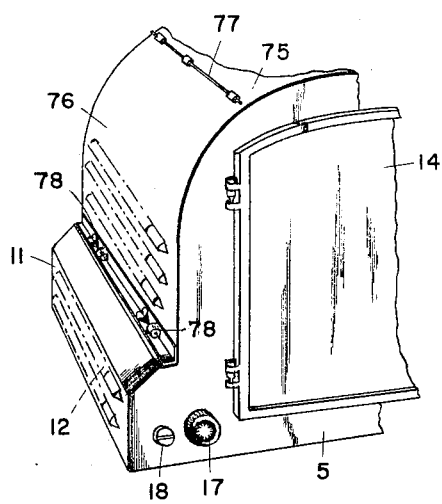
FIGURE 10 is a fractional perspective view of one side of the enclosure, illustrating the longitudinal hinge in the side wall thereof.
Figure 12:
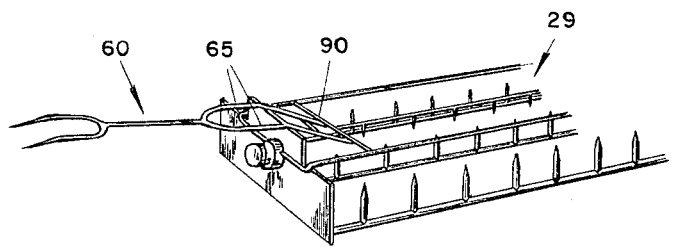
FIGURE 12 is a fractional perspective view of one of the spit assemblies showing the lifting operation of same by means of the combination fork and lifter.

The fork 60 illustrated in FIGURE 7 is a multi-purpose tool, its sharp tongs 61 at one end 62 thereof being utilized in handling the pieces of food upon there being placed in or being removed from spits 29 while the opposite end 63 of the handle 64 supports a pair of legs 65—65 of elongate Z configuration and joined by a cross bar 66 adjacent the outer end thereof. End 63 is adapted to co-operate with the closable end of spit 29, both in placing the full spit 29 on frame 28 or in removing it therefrom as illustrated in FIGURE 12. More particularly it is utilized to engage and disengage the lip 45 of upper jaw 39 to manipulate the lock mechanism 44.

In operation the following steps are carried out:

(A) First remove the spit assembly 27 from casing 1 by sliding it out upon frame 31, the upper part of which is level with interior floor 6 of casing 1. This is achieved by engaging legs 65 of fork 60 with the lower stabilizing cross bar 93 extending across the front end of frame 28, thereafter withdrawing spit assembly 27 from casing 1.

(B) Controls 17 for the gas supply are turned on and the gas ignited on the surface 37 of the gas panels 15 inside casing 1.

(C) Door 14 is then closed.

(D) While the interior of the casing 1 is being preheated, each spit 29 is removed from frame 28 by engaging legs 65 of fork 60 with a cross bar 90 extending across upper jaw 39, spaced apart from and parallel to front lip 45 as illustrated in FIGURE 12.

(E) Spits 29 are then opened by engaging legs 65 of fork 60 with eyes 88 on lock 44, which then may be slid backward until lip 45 is disengaged.

(F) The parts of chickens or similar prepared meat or fish to be grilled are then secured upon lower jaw 38 of each spit 29 after which upper jaw 39 may be placed over the parts of the meat to be grilled, spikes 41 and 42 thereby securing the said parts in the spit.

(G) Legs 65 of fork 60 are then used to engage with eyes 88 of lock 44, pushing the said lock forward to engagement with lip 45 on upper jaw 39 and locking the same securely into place. This may be repeated for any number of spits up to the capacity of the device.

(H) Each spit 29 is then lifted as aforementioned by fork 60 and placed upon frame 28, the spits 29 being supported front and rear by bearings 47. Spit assembly 27 still resting upon frame 31 is then wheeled in front of casing 1 the door 14 of which has been opened and in which motor 21 has been activated by turning on switch 18.

(I) Spit assembly 27 is pushed into the oven casing by engaging cross bar 66 of fork 60 with stabilizing cross bar 93 on front end of frame 28. Slid fully into place, a rotating movement of all spits 29 brings the same in proper engagement with sockets 24, the door 14 being closed and the desired time in which the food is to be grilled being set upon timer 16.

As an example timer should be set on 15–20 minutes for grilling of pieces of fresh chickens and 20–30 minutes for pieces of deep frozen chickens. The time differences relate to type and thickness of the parts of chickens to be grilled.

In the manner as heretofore described, infra-red burners 15 provide intense heat radiation directed towards the rotating spits 29, and in a very short time the outer skin or flesh is sealed by the heat thus preserving juices and flavour in the meat.

As the spits 29 rotate about their axes, it will be noted that their alignment across the upward flow path of heated air and gas in casing 1 will cause the same to disturb and agitate the natural convectional flow and procure rapid circulation within casing 1, spits 29 being driven at the best speed to secure active circulation without permitting the air to become static.

Due to this type of radiation the time of grilling is comparatively short and, upon the timer 16 running out, door 14 may be opened and assembly 27 removed by use of frame 31 as aforesaid. The upper jaw 39 of each spit 29 may easily be opened by manipulating of lock 44 by fork 60 as described, the grilled chicken parts or other similar prepared meats or fish then being removed from spikes 41.

Another preferred method of using this apparatus is related to its mobility and may be characterized as a continuous grilling operation. An extra spit may be provided in action to the capacity of the spit assembly 27. Utilizing this method the spit assembly 27 is left inside casing 1 during the preheating process in which time the extra spit is filled with chicken parts or the like. When this spit is ready, the door 14 may be opened and the spit assembly 27 may be slid out so much only that rotation of the spits stops, thus showing full disengagement with sockets 24. One spit may then easily be removed by using fork 60 as a lifter as aforementioned and be replaced by the spit just filled with chicken parts. The timer is then set for a full hour after which a spit may be taken out and replaced every four of five minutes. By the time the fourth spit is ready to be lifted into the oven, the pieces of chicken or similar prepared meat or fish according to the type and thickness of the meat or fish being grilled on the first spit are grilled and ready to vend.

From FIGURES 1, 8, 9, 10 and 11 further details of the construction of a preferred embodiment of the invention are illustrated. Door 14 comprises a sheet of thermo glass 70 retained in a U section frame 71, the upper end 72 of which is open to permit glass 70 to be slid out for cleaning purposes. Handle 73 on a stem 74 extended outwarlly from the outermost vertical portion of frame 71 and experiments has shown handle 73 is preferably hollow and formed of a suitable metal.

According to a further embodiment casing 1 may include a wrap around outer wall 75, one side 76 of which is able to be moved arcuately upwardly about a hinge 77 when it is required to gain access to the interior for cleaning and servicing. At other times side 76 is clipped securely on the base as by fastener 78.

To provide full mobility to casing 1, a set of four wheels 80 may be fitted to the base thereof, wheels 80 being supported by box members 81 which in turn are secured to angle cross members 82 which form the bottom support for casing 1.

Figure 13:
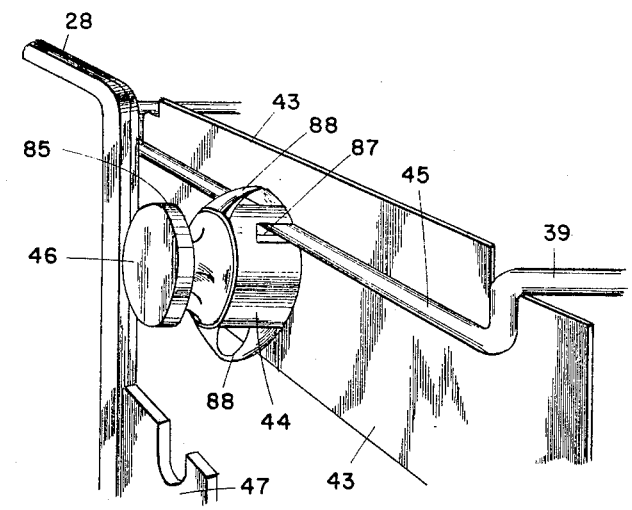
FIGURE 13 is an enlarged perspective view of a combination locking and front supporting mechanism for a spit assembly.

FIGURE 13 illustrates particularly the locking mechanism 44 of a spit 29 on assembly 27 in which stud 46, extending outwardly from front plate 43 is waisted to provide a bearing support 85. A locking sleeve 44 is slidably operable upon stud 46 and a minor chordal slot 87 is formed therein to closely receive the front lip 45, the latter being released only upon sleeve 44 moved away from front plate 43. Upon being assembled to frame 28, the waisted support piece 85 rests in bearing 47 which thereafter prevents sleeve 44 from moving. In this manner spit 29 may rotate freely upon frame 28 without danger of front lip 45 becoming unlocked and food dropping off spit 29.

A pair of diametrically opposed eyes 88 are formed on sleeve 44 and adjusted to receive the legs 65 of fork 60 so that, upon spit assembly 27 being removed from casing 1 in an extremely hot condition, legs 65 may be inserted in eyes 88 and sleeve 44 slid back to free lip 45, thereby permitting jaws 38 and 39 to be separated and the grilled food removed therefrom.

From FIGURES 2 and 5 particularly it should be noted that in a preferred embodiment, drive motor 21 and sprockets 23 may be protected by a cover 91 which is located and supported by two pins 92—92.

It is to be understood that although specific features of the present embodiment have been illustrated and described herein the present invention also contemplates such variations as may fall within the scope of the following claims.

What I claim is:

1. Apparatus for grilling chicken and like foods and comprising: a casing defining an enclosure and including a bottom, opposed vertical side walls, opposed vertical end walls, and a curved imperforate roof arched between said side walls; a door in one of said end walls; heating chambers mounted exteriorly of said casing along each of said side walls adjacent the junction between said side walls and said bottom of said casing; gaseous fuel jet means located within said heating chambers; air inlet ventilating means communicating said heating chambers directly to the atmosphere exteriorally of said casing admitting air thereto for formation of a combustible mixture with said gas; heat radiant combustion panels of a porous structure communicating between said heating chambers and the interior of said casing along the lower edges of said side walls for combustion of said mixture and transmission of radiant heat to said enclosure; fume ventilating means located in said side walls spaced downwardly from said curved roof and immediately vertically above said combustion panels; rotatable means for supporting said foods in said enclosure spaced from said casing, and drive means for said rotatable means.

2. Apparatus as claimed in claim 1, wherein said ventilating means is formed in said casing by openings oriented downwardly and defining a downdraft path from said casing.

3. Apparatus as claimed in claim 1, wherein said drive means includes a drive motor, and transmission means attached to one of said end walls, and drive shafts extending through said end wall into the interior of said enclosure.

4. Apparatus as claimed in claim 1, wherein said supporting means includes a tray member, support frames extending upwardly from each end of said tray, a crossmember extending between said support frames, and pairs of bearing means mounted in alignment with one another on respective said support frames.

5. Apparatus as claimed in claim 1, wherein said supporting means includes a pair of plate members, a plurality of rods extending between plate members in parallel relation, fastening spikes extending at spaced intervals from said rods substantially normal thereto and substantially parallel to the planes of said plate members, and a clamping member hingedly mounted to one of said plate members and releasably lockable to other said plate member.

6. Apparatus as claimed in claim 1, wherein said supporting means includes a tray member, support frames extending upwardly from each end of said tray, a crossmember extending between said support frames, and pairs of bearing means mounted in alignment with one another on respective said support frames; a pair of plate members, a plurality of rods extending between plate members in parallel relation, fastening spikes extending at spaced intervals from said rods substantially normal thereto and substantially parallel to the planes of said plate members, and a clamping member hingedly mounted to one of said plate members and releasably lockable to other said plate member; bearings extending from each of said plate members along a common axis and engageable with said support brackets, and drive means formed on one of said bearings.

References Cited by the Examiner

UNITED STATES PATENTS

| | | | |
|---|---|---|---|
| 521,718 | 6/1894 | Koll | 99—392 |
| 1,045,049 | 11/1912 | Longfellow et al. | |
| 1,309,049 | 7/1919 | Syrett. | |
| 1,666,394 | 4/1928 | Miglin | 99—401 X |
| 1,762,257 | 6/1930 | Burkhardt. | |
| 2,144,918 | 1/1939 | Garvis | 99—427 X |
| 2,262,498 | 11/1941 | Holm-Hansen | 99—401 X |
| 2,614,483 | 10/1952 | Scofield | 99—427 X |
| 2,847,932 | 8/1958 | More | 99—421 |
| 2,888,872 | 6/1959 | Bathe. | |
| 2,985,096 | 5/1961 | Wolske | 99—421 |
| 2,997,941 | 8/1961 | Phelan et al. | 99—444 X |
| 2,998,814 | 9/1961 | Forsberg. | |
| 3,100,435 | 8/1963 | Mobley | 99—421 |
| 3,122,134 | 2/1964 | Reeves. | |
| 3,130,662 | 4/1964 | Robinson | 99—421 X |

WALTER A. SCHEEL, *Primary Examiner.*